(12) United States Patent
Mujtaba et al.

(10) Patent No.: US 10,271,283 B2
(45) Date of Patent: Apr. 23, 2019

(54) APPARATUS, SYSTEMS AND METHODS FOR POWER MANAGEMENT IN MOBILE DEVICES

(71) Applicant: APPLE INC., Cupertino, CA (US)

(72) Inventors: Syed Aon Mujtaba, Santa Clara, CA (US); Santhanakrishnan Geeyarpuramnadathur, Cupertino, CA (US); Matthias Sauer, Campbell, CA (US); Tarik Tabet, San Jose, CA (US)

(73) Assignee: APPLE INC., Cupertino, CA (US)

( * ) Notice: Subject to any disclaimer, the term of this patent is extended or adjusted under 35 U.S.C. 154(b) by 249 days.

(21) Appl. No.: 15/151,990

(22) Filed: May 11, 2016

(65) Prior Publication Data
US 2016/0337165 A1 Nov. 17, 2016

Related U.S. Application Data (60) Provisional application No. 62/161,217, filed on May 13, 2015, provisional application No. 62/163,138, filed on May 18, 2015.

(51) Int. Cl.
*H04W 52/02* (2009.01)

(52) U.S. Cl.
CPC ... *H04W 52/0261* (2013.01); *H04W 52/0251* (2013.01); *Y02D 70/00* (2018.01); *Y02D 70/1262* (2018.01); *Y02D 70/1264* (2018.01); *Y02D 70/23* (2018.01); *Y02D 70/26* (2018.01)

(58) Field of Classification Search
CPC .......... H04W 52/0261; H04W 52/0251; Y02B 60/50
See application file for complete search history.

(56) References Cited

U.S. PATENT DOCUMENTS

| | | | | |
|---|---|---|---|---|
| 5,878,326 | A * | 3/1999 | Benz | H04W 88/185 340/7.52 |
| 8,615,267 | B1 * | 12/2013 | Narendran | H04W 52/50 455/522 |
| 2001/0005686 | A1 * | 6/2001 | Naito | G06F 1/28 455/574 |
| 2002/0096148 | A1 * | 7/2002 | Trumpy | F02M 33/02 123/519 |
| 2004/0203429 | A1 * | 10/2004 | Anderson | H04W 64/00 455/67.11 |

(Continued)

*Primary Examiner* — Christine Ng
(74) *Attorney, Agent, or Firm* — Fay Kaplun & Marcin, LLP (57) ABSTRACT

An apparatus, system and method for determining whether a battery alarm of a UE is asserted, reducing a transmission duty cycle of the UE to zero for a first predetermined time period when the battery alarm is asserted, determining whether the battery alarm has been de-asserted after the first predetermined time period and when the battery alarm has not been de-asserted, increasing the transmission duty cycle to a first threshold level for a second predetermined time period, wherein the first threshold level is less than a full transmission duty cycle of the UE. When the battery alarm has been de-asserted, increasing the transmission duty cycle to a second threshold level for a third predetermined time period, wherein the second threshold level is less than the full transmission duty cycle of the UE, and wherein the second threshold level is greater than the first threshold level.

20 Claims, 4 Drawing Sheets

(56) References Cited

U.S. PATENT DOCUMENTS

| | | | | |
|---|---|---|---|---|
| 2005/0003827 A1* | 1/2005 | Whelan | ............... | H04W 16/10 |
| | | | | 455/454 |
| 2005/0096016 A1* | 5/2005 | Tervo | .................... | H04L 67/16 |
| | | | | 455/414.1 |
| 2007/0097912 A1* | 5/2007 | Kawaguchi | ........... | H04W 72/06 |
| | | | | 370/329 |
| 2007/0287464 A1* | 12/2007 | Hamamoto | ............. | H04L 5/06 |
| | | | | 455/447 |
| 2012/0057486 A1* | 3/2012 | Abedi | .................. | H04W 84/18 |
| | | | | 370/252 |
| 2012/0176963 A1* | 7/2012 | Vashi | ................ | H04W 76/027 |
| | | | | 370/328 |
| 2013/0242716 A1* | 9/2013 | Amerga | ............. | H04W 76/027 |
| | | | | 370/216 |
| 2014/0301239 A1* | 10/2014 | Fukuta | ................ | H04W 24/10 |
| | | | | 370/252 |
| 2015/0085762 A1* | 3/2015 | Matin | .................. | H04W 24/02 |
| | | | | 370/329 |
| 2015/0188592 A1* | 7/2015 | Solondz | ............. | H04B 1/3888 |
| | | | | 455/501 |
| 2017/0033912 A1* | 2/2017 | Onggosanusi | ....... | H04B 7/0626 |

* cited by examiner

Graph 400

APPARATUS, SYSTEMS AND METHODS FOR POWER MANAGEMENT IN MOBILE DEVICES

PRIORITY INFORMATION/INCORPORATION BY REFERENCE

This application claims priority to U.S. Provisional Application 62/161,217 entitled "Apparatus, Systems and Methods For Power Management in Mobile Devices," filed on May 13, 2015, and U.S. Provisional Application 62/163,138 entitled "Apparatus, Systems and Methods For Power Management in Mobile Devices," filed on May 18, 2015, the entirety of both provisional applications are incorporated herein by reference.

BACKGROUND

In wireless telecommunication networks, the Long-Term Evolution, or "LTE," is defined as a standard for wireless communication of high-speed data for mobile phones and data terminals. The LTE standard is developed by the Third Generation Partnership Project ("3GPP") and the Institute of Electrical and Electronics Engineers ("IEEE"). An exemplary LTE access network is a wireless network of base stations, or evolved NodeBs ("eNBs"), that are interconnected without a centralized intelligent controller. By distributing the intelligence among the eNBs in LTE network, the time for setting up a connection with a mobile device (e.g., user equipment (UE)) is reduced as well as the time required for a handover to another eNB. Furthermore, through the development of the LTE standard, mobile devices are able to increase their capacity and speed using a different radio interface together with core network improvements.

As with any Radio Access Technology, an exemplary LTE network utilizes radio link budgeting. A link budget on a UE is described as an account of the gains and losses from the transmitter of the UE, through the medium (free space, cable, waveguide, fiber, etc.) to the receiver in the telecommunication system. The link budget calculations may be used to estimate a maximum allowed signal attenuation between the UE and the eNB. For instance, an exemplary link budget calculation may be: received power (dBm) =transmission power+gains−losses.

Certain classes of LTE devices, such as the UE, are expected to operate at the maximum allowable transmit power in the uplink communication to the eNB, such as +23 dBm as defined by the 3GPP. However, while operating at the maximum transmit power, the UE also consumes a large amount of power from the battery.

For battery-constrained systems, a large current draw from multiple components at the same time is likely to trigger a battery alarm, such as an undervoltage lockout ("UVLO"), if the battery voltage drops to a critical value. An UVLO may be used to monitor the battery charge and/or turn off an electronic circuit in the UE if the battery voltage drops below a specific threshold, thereby protecting the components of the UE. One skilled in the art would understand that this condition may be referred to as "peak power syndrome." Accordingly, there is a need for systems and methods to mitigate the effects of peak power syndrome through improved transmission power management.

SUMMARY

Described herein are an apparatus, systems and methods for power management of a user equipment ("UE") in a wireless communication system, such as an LTE network. A method includes determining whether a battery alarm of the UE is asserted, reducing a transmission duty cycle of the UE to zero for a first predetermined time period when the battery alarm is asserted, determining whether the battery alarm has been de-asserted after the first predetermined time period and when the battery alarm has not been de-asserted, increasing the transmission duty cycle to a first threshold level for a second predetermined time period, wherein the first threshold level is less than a full transmission duty cycle of the UE.

Further described is a user equipment ("UE") having a battery, a power management component that monitors the battery and asserts a battery alarm and a baseband processor that controls a transmission duty cycle of the UE, wherein the baseband processor reduces a transmission duty cycle of the UE to zero for a first predetermined time period when the battery alarm is asserted and wherein, after the first predetermined time period, the baseband processor further increases the transmission duty cycle to a first threshold level for a second predetermined time period when the battery alarm continues to be asserted and increases the transmission duty cycle to a second threshold level for a third predetermined time period when the battery alarm has been de-asserted.

Also described is a baseband processor of a user equipment ("UE") having a general purpose input receiving an indication that a battery alarm has been asserted for the UE and circuitry configured to control a transmission duty cycle of the UE, wherein the circuitry reduces a transmission duty cycle of the UE to zero for a first predetermined time period when the battery alarm is asserted and wherein, after the first predetermined time period, the circuitry further increases the transmission duty cycle to a first threshold level for a second predetermined time period when the battery alarm continues to be asserted and increases the transmission duty cycle to a second threshold level for a third predetermined time period when the battery alarm has been de-asserted.

DETAILED DESCRIPTION

The exemplary embodiments may be further understood with reference to the following description and the appended drawings, wherein like elements are referred to with the same reference numerals. The exemplary embodiments describe an apparatus, system and method for managing the transmission power of mobile devices in a wireless communication network. In the exemplary embodiments, a mobile device will be described as user equipment ("UE") and the base station will be described as an evolved Node B ("eNB") base station, which is generally known as being a base station associated with LTE networks. However, it will be understood by those skilled in the art that UEs, base stations or access points operating in accordance with other network standards may also implement the exemplary embodiments in accordance with the functionalities and principles described herein.

Figure 1:
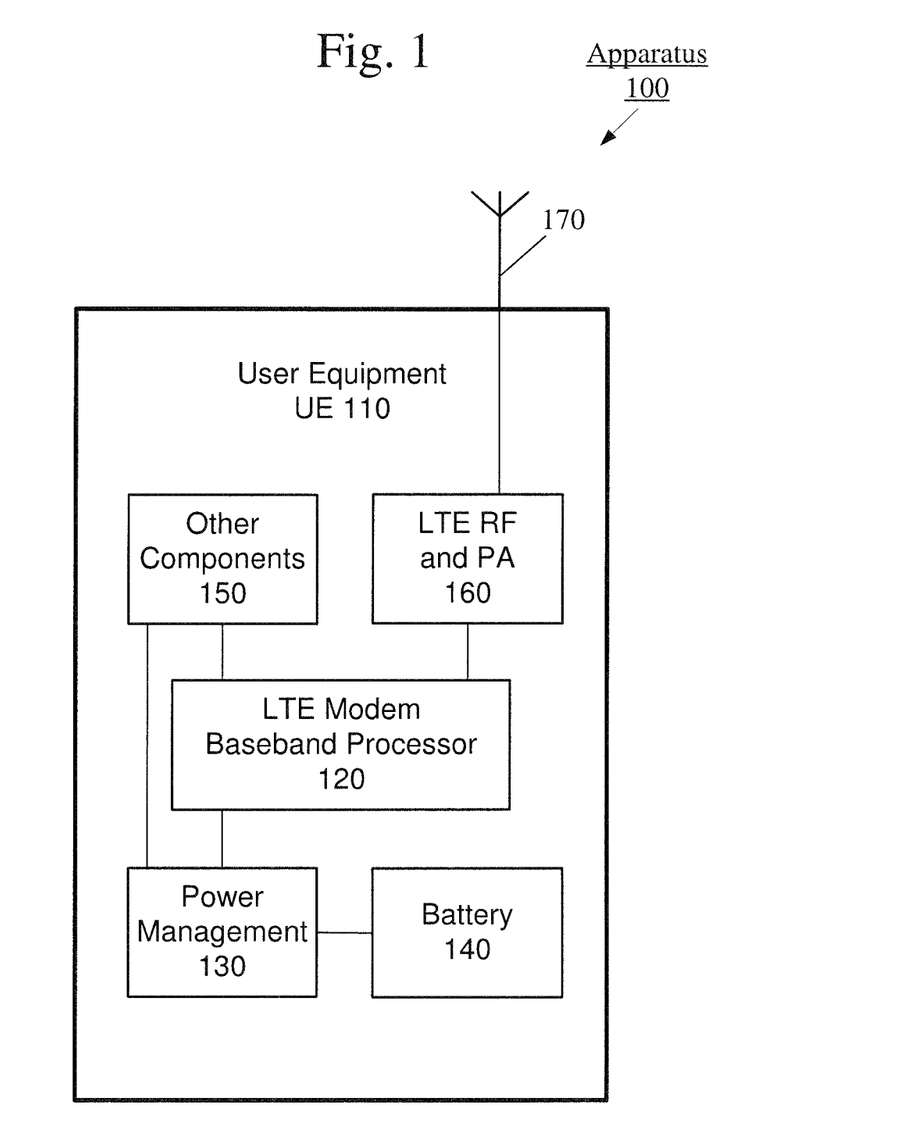
FIG. 1 shows an exemplary LTE mobile device or UE for power management according to various exemplary embodiments described herein.

FIG. 1 shows an exemplary apparatus 100 for peak power management at a mobile device in a wireless network according to various exemplary embodiments described herein. The exemplary apparatus 100 may include the mobile device, such as an UE 110, in communication with a network, such as an LTE network. Furthermore, the UE 110 may include a baseband processor having an LTE modem 120, a power management component 130, a battery 140, additional components 150 (e.g., application processor, display, camera, camera flash, any other components that may be power managed, etc.), LTE radio frequency ("RF") transceivers and power amplifiers ("PAs") 160, and at least one antenna 170. Those skilled in the art will understand that the UE 110 may be any type of electronic component that is configured to communicate via a network, e.g., mobile phones, tablet computers, desktop computers, smartphones, phablets, embedded devices, wearables, etc.

The baseband processor 120 manages the radio functions of the UE 110. The baseband processor 120 and the LTE RF and PA 160 may be, for example, general purpose processors, an application specific integrated circuit (ASIC), another type of integrated circuit and these processors may execute software programs or firmware. The power management component 130 may be a separate hardware component such as an integrated circuit or processor (that may execute software or firmware) to perform the functions described herein for the power management component 130. In another exemplary embodiment, the power management component 130 is an integral part of the battery 140, e.g., the battery itself through the use of a connected integrated circuit performs the functionalities of the power management component 130. In a further exemplary embodiment, the functionalities of the power management component 130 may be performed by a different hardware device of the UE 110 such as the application processor (not shown), the baseband processor 120, etc. In this exemplary embodiment, the power management component 130 may be software or firmware executed by these other hardware components.

In order to perform the transmission of the LTE signals, the baseband processor 120 may receive digitized data from another component, such as the application processor, and encode the data for transmission. The encoded data is output to transmit circuitry, where it is modulated by one or more carrier signals having a desired transmit frequency or frequencies. The LTE RF and PA 150 may then amplify the modulated carrier signals to a level appropriate for transmission, and deliver the modulated carrier signals via the antenna 170 to the network.

The exemplary antenna 170 may transmit and receive radio frequency signals bearing information to/from one or more remote transmitters provided by a base station (e.g., eNB) within the wireless network. The power management component 130 may monitor the battery 140 usage by the apparatus 100 and inform the baseband processor 120 of a battery alarm based on the usage of the battery 140. For instance, the battery alarm may be an undervoltage lockout ("UVLO") alarm indicating that the voltage at the battery 140 has dropped below a predetermined threshold. The baseband processor 120 may provide RF control information to the LTE RF and PA 160, and may also provide LTE priority indicators to the other components 150 of the UE 110. As will be described in greater detail below, the LTE priority indicators inform the other components 150 when the baseband processor 120 has determined that an LTE uplink signal must be sent by the apparatus 100 or the network may declare a radio link failure (RLF) for the apparatus 100. The LTE priority indicators notify the other power consumers of the UE 110, such as the display, the camera, camera flash, etc. to reduce their respective power consumption to a lower power state. Accordingly, the LTE modem and processor 120 may then be assured that there is sufficient battery power to transmit uplink LTE signals and notify the network that the UE 110 is active and prevent the network from declaring an RLF.

According to the exemplary embodiments described herein, the exemplary baseband processor 120 may process the digitized received signal to extract the information or data bits conveyed in the received signal. This processing may include demodulation, decoding, and error correction operations. Accordingly, the baseband processor 120 may be implemented in one or more digital signal processors ("DSPs") or application-specific integrated circuits ("ASICs"). As described above, the information received from the network (e.g., via any one of the eNBs) may be used by the UE 110 to manage the power consumption of the devices. Specifically, to mitigate for peak power syndrome, the exemplary systems and methods described herein may manage the transmission power of the LTE modem 120 to help reduce the current burden on the battery 140. As the apparatus 100 permits, the UE 110 may then gradually increase the transmission duty cycle of the LTE modem 120 to resume normal operation of the UE 110.

One skilled in the art would understand that a duty for the exemplary UE 110 may describe repeating active state behavior (e.g., on or off) of the LTE modem 120. The duty cycle may include both duty cycle period and duty cycle percentage. The duty cycle period may define how often the on/off pattern repeats (e.g., measured in milliseconds) and the duty cycle percentage may define the fraction of the period that LTE is turned on. As will be described in greater detail below, exemplary duty cycle percentages of the LTE modem 120 may include an unconstrained duty cycle (e.g., 100% LTE transmission cycle) for normal usage, a limited duty cycle (e.g., 50% or 25% LTE transmission cycle), and a zeroed duty cycle (e.g., 0% LTE transmission cycle) or a "blanked" LTE uplink transmission cycle.

Figure 2:
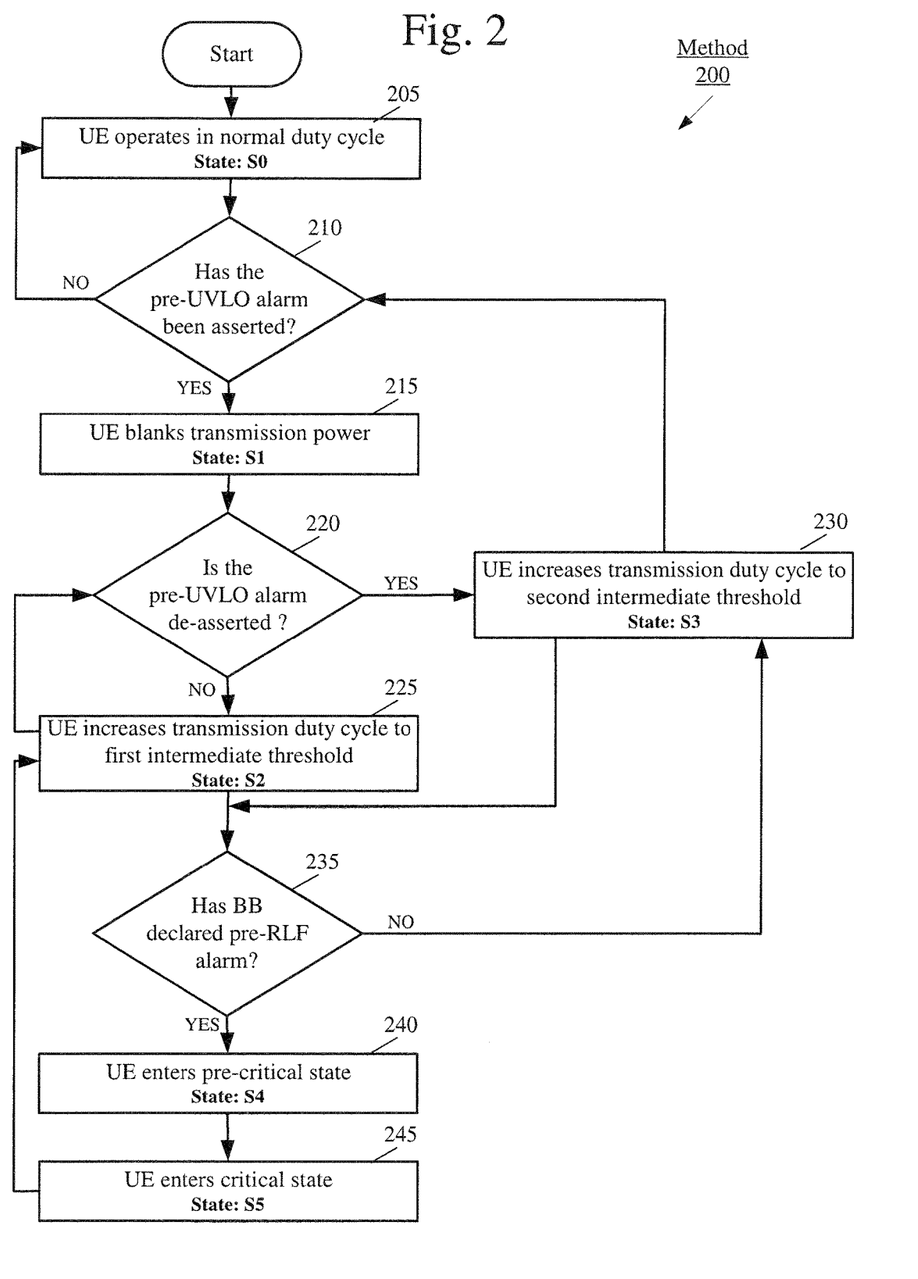
FIG. 2 shows an exemplary method for power management in LTE mobile devices, such as a UE, according to various exemplary embodiments described herein.

FIG. 2 shows an exemplary method 200 for power management in LTE mobile devices, such as the UE 110, according to various exemplary embodiments described herein. It is noted that the entirety of method 200 may be performed by the UE 110 capable of monitoring a battery performance alarm (e.g., a pre-UVLO notification) and adjusting the transmission power of the device. As was described above, the UVLO alarm is an indication that the battery voltage is below a predetermined threshold. The pre-UVLO notification is an indication that the battery voltage is near the UVLO threshold. Various devices may set the pre-UVLO notification at some level before UVLO threshold based on the expected voltage drain of the components of the UE 110. For example, a first UE 110 that has many peripheral features such as a camera, multiple radios, etc., may set the pre-UVLO notification threshold at a greater voltage compared to the UVLO voltage threshold than a second UE 110 that has less peripherals, because the first UE 110 with many peripherals is likely to drain the battery faster through the use of the peripherals. However, the manufacturer (or other entity) may set the pre-UVLO notification to any value above the UVLO threshold. The exemplary method will be described with reference to the power management component 130 asserting a pre-UVLO alarm. However, those skilled in the art will understand that other types of battery alarms may also be used as a trigger in the same manner as described for the pre-UVLO alarm in the method 200.

In 205, the UE 110 is operating in state S0, which may be considered a normal condition wherein the duty cycle is unconstrained and has a duty cycle of 100% LTE transmission (e.g., all scheduled LTE transmissions/receptions are performed). While in state S0, the power management component 130 may monitor the usage of the battery 140. For example, the power management component 130 may monitor the network scheduling information history to monitor and compute an averaged window duty cycle. This is one exemplary metric that the power management component 130 may use to decide if a battery issue may arise. However, there may also be other manners of monitoring the battery usage. If the power management component 130 determines that there is an issue with the usage of the battery 140, the power management component 130 may assert a pre-UVLO alarm (210). If the pre-UVLO alarm is asserted, the baseband processor 120 may receive this alert via, for example, a general purpose input/output ("GPIO") of the baseband processor 120, e.g., the BB_TX_INHIBIT GPIO. Accordingly, this alert may be kept as asserted as long as the pre-UVLO is actively asserted, e.g., the BB_TX_INHIBIT GPIO may be held at a high value when the pre-UVLO is actively asserted. If there is no pre-UVLO alarm asserted, the baseband processor 120 may continue operating the UE 110 in state s0.

If the pre-UVLO alarm is asserted, the method 200 continues to 215, where the UE 110 ceases transmissions or blanks its transmission power. In other words, the UE 110 reduces its transmission duty cycle to 0% of standard operations. This blanked transmission duty cycle may be referred to as state S1 for the LTE modem 120 of the UE 110. It may be noted that the state S1 is not a sustainable state, because as described above, if the network does not receive any transmissions from the UE 110, the network may declare an RLF for the UE 110 and require that the UE 110 re-connect to the network via the eNB. This reconnection process may consume more power and will provide a less than satisfactory user experience.

Thus, the method 200 may advance to 220 after a pre-determined time period has passed with the UE 110 in state S1. In one example, the pre-determined time period may be 3 ms. However, those skilled in the art will understand that the pre-determined time period may be different based on any number of factors, e.g., type of UE, type of network, path loss, coverage area, etc. In 220, the UE 110 may determine whether or not the pre-UVLO alarm has been de-asserted. Specifically, the power management component 130 of the UE 110 may monitor the battery 140 for the battery alarm and notify the baseband processor 120 of the current state of the pre-UVLO alarm (e.g., asserted or de-asserted).

If the pre-UVLO alarm remains asserted, the exemplary method 200 may advance to 225, wherein the UE 110 transitions from state S1 to state S2. While in state S2, the UE 110 may increase to a higher duty cycle that is intermediate between the normal duty cycle of state S0 and the blanked state S1, such as 25% of standard operations. The UE 110 may remain in state S2 as long as the pre-UVLO alarm remains asserted. During this time in state S2, the UE 110 may continue to monitor whether the pre-UVLO alarm remains asserted (220).

If the pre-UVLO alarm has been de-asserted as determined in 220, either after the UE 110 has been in state S1 for the pre-determined time period or while the UE 110 has been in state S2, the method continues to 230 where the UE 110 transitions to state S3 that may be a higher duty cycle that is intermediate between the normal duty cycle of state S0 and the blanked state S1, such as 50% of standard operations. Thus, in this example, the state S3 intermediate state has a higher duty cycle than the state S2 intermediate state. With the pre-UVLO alarm de-asserted, the UE 110 may operate on a limited transmission duty cycle, such as a 50% cycle (state S3), for a second predetermined period of time. Thus, the UE 110 may transition either from state S1 or state S2 to state S3, depending on when the pre-UVLO alarm has been de-asserted. The state S3 may be considered a transition state to allow the UE 110 to transition back to state S0 without a ping-pong effect where the UE 110 transitions back and forth between state S0 and state S1 constantly. Thus, the transition to a 50% duty cycle in state S3 allows that if the pre-UVLO alarm remains de-asserted for the second pre-determined period of time (as determined in 210), the UE 110 may then transition back to the normal state S0 (205). However, if the pre-UVLO alarm is re-asserted while the UE is in state S3 (as determined in 210), the UE 110 may then transition to state S1 (215).

While the UE 110 is in either state S2 or state S3 (e.g., 25% duty cycle or 50% duty cycle, respectively), the baseband processor 120 may raise a pre-radio link failure ("RLF") alarm (235). The pre-RLF alarm may be raised at a point in time where the baseband processor 120 considers that it is imminent that the network may declare an RLF for the UE 110 because it has not received any uplink communications from the UE 110. Examples of reasons that the baseband processor 120 may consider an RLF imminent include that a third pre-determined period of time has passed since an uplink transmission has been sent and acknowledged, a number of non-acknowledgements (NACKs) have been received from the network, etc. Those skilled in the art will understand that there may be any number of reasons that the baseband processor 120 may consider an RLF declaration by the network to be imminent and any of these reasons may be used by the baseband processor 120 to trigger the pre-RLF alarm in 235. An exemplary method of determining a pre-RLF alarm will be described in greater detail in relation to method 300 of FIG. 3.

If there is no pre-RLF alarm while the UE is in either of states S2 or S3, the UE 110 continues operating as in accordance with the method 200. However, if a pre-RLF alarm is generated by the baseband processor 120, the UE 110 enters the pre-critical state S4 (250). In the state S4, the baseband processor 120 may notify the other components 150 of the apparatus 100 by asserting a GPIO output, e.g., a BB_TX_BLANK INDICATOR. In other examples, the baseband processor 120 may notify the other components 150 using different forms of broadcast signaling (e.g. an Ethernet bus, I2C bus or similar). The baseband processor 120 may have other manners of broadcasting the pre-RLF alarm to the other components 150 and/or the power management component 130 such as a dedicated HW channel. As described above, this may be considered the LTE priority signal, indicating that the LTE modem 120 will not honor the pre-UVLO alarm and will transition to full power mode (e.g., state S0) because the baseband processor 120 considers an RLF imminent and therefore an uplink signal needs to be sent to the network. This LTE priority signal will inform the other components 150 that they should refrain from using more than minimal power while the LTE priority signal is asserted. The UE 110 will remain in the pre-critical state S4 for a third pre-determined period of time so that the other components 150 may gracefully transition to a lower power state without causing adverse effects on the UE 110. While in the pre-critical state S4, the duty cycle of the previous state may be honored. For instance, if the previous duty state was 25% during state S2 from 225, the duty cycle in S4 may remain 25%. Alternatively, if the previous duty state was 50% during state S3 from 230, the duty cycle in S4 may remain 50%.

Following the duration of the third predetermined time period of 240, the method 200 may advance to 245 where the UE 110 may transition from state S4 to state S5. The S5 state may be defined as a critical state for the UE 110 where the LTE modem 120 is allowed to operate unconstrained (e.g., the same as state S0). It should be noted that since the burden on the UE 110 is high when operated in such an unconstrained manner (e.g., because the UE 110 may still be in a pre-UVLO alarm state), the duration of the S5 state should be as short as possible (e.g., for the period of time that the baseband processor 120 is asserting the pre-RLF alarm.) In the unconstrained state S5, the UE 110 will send uplink signals to the eNB so that the network is aware that the UE 110 remains in a connected state and does not declare an RLF. The UE 110 will remain in the state S5 until the baseband processor 120 de-asserts the pre-RLF alarm.

When the baseband processor 120 de-asserts the pre-RLF alarm, the method 200 may return to 225 as the UE 110 exits state S5 and transitions back to state S2. For instance, the UE 110 may exit the critical state S5 upon receiving acknowledgments ("ACKs") from an eNB for its uplink data transmissions and/or send measurement reports to the eNB, such as channel quality indicators ("CQIs"). By transitioning from state S5 to S2, the UE 110 is allowed to gracefully recover from the critical state into a limited duty cycle state. As part of exiting from the state S5, the baseband processor 120 will de-assert the LTE priority signal, thereby allowing the other components 150 to resume normal power operations.

Figure 3:
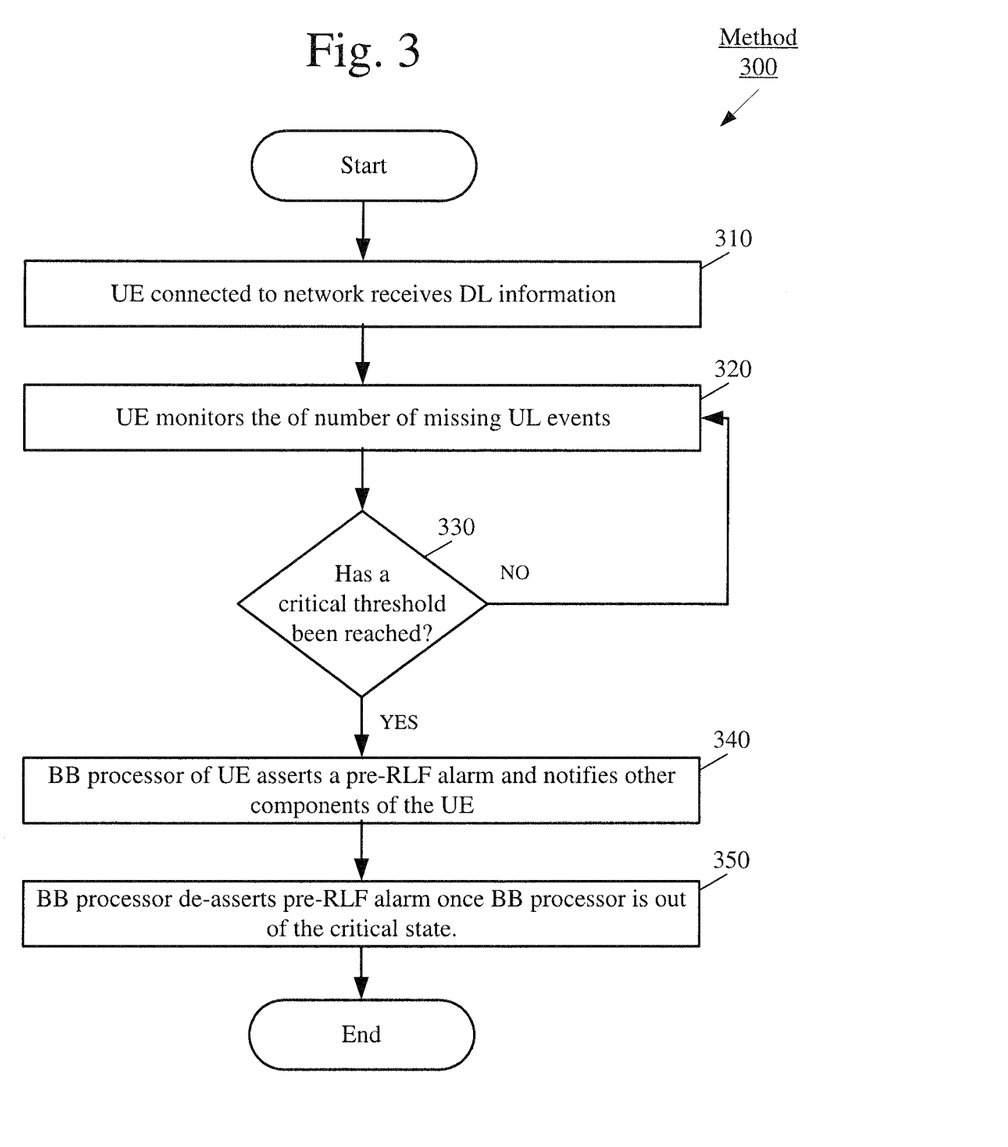
FIG. 3 shows an exemplary method for asserting a pre-radio link failure ("RLF") alarm at the UE during peak power syndrome according to various exemplary embodiments described herein.

FIG. 3 shows an exemplary method for asserting a pre-radio link failure ("RLF") alarm at the UE 110 during peak power syndrome according to various exemplary embodiments described herein.

One skilled in the art would understand that the eNB typically expects a response from the UE 110 when the eNB sends either downlink data to the UE 110 that requires an ACK or downlink commands for measurement reports, such as CQIs, or the eNB gives an UL grant for a scheduled UL transmission, but the UE does not transmit any packet. When the UE 110 fails to honor any of these requests, the eNB maintains internal counters and timers. At the threshold of the counters and/or the expiration of the timers, the eNB may declare an RLF with the UE 110 and tears down the established radio resource control ("RRC") connection. The re-establishment of an RRC connection consumes energy and is detrimental to the user experience during an active session. This is of particular importance for those use cases that are real-time in nature, such as voice over LTE ("VoLTE"), wherein an RRC disconnect during a VoLTE call may lead to a dropped call. Accordingly, method 300 may be implemented to allow the UE 110 to assert a pre-RLF alarm as described with reference to 240 in method 200.

In 310, the exemplary UE 110 is connected to a wireless communication network and may receive downlink information from an eNB. Accordingly, the UE 110 is able to receive information from the network (e.g., the downlink is in operation) despite the network not receiving information from the UE 110 (e.g., the uplink is operational, but the UE 110 is in a reduced duty cycle as described above).

In 320, the UE 110 may monitor the link from the eNB and record a number of missing uplink events from the UE 110 to the eNB. The number of missing uplink events may be events that the UE 110 willfully ignores in the reduced duty cycle such as not sending requested measurement reports or events that the UE 110 responded to, but were not received by the eNB as indicated by the receipt of a NACK from the eNB. The component of the UE 110 that monitors the link may be the baseband processor 120. However, another component of the UE 110 may also monitor the link, e.g., the application processor.

In 330, the UE 110 may determine whether or not the number of missing events exceeds a predetermined threshold value. If the threshold value is not achieved, the method 300 may return to 320 wherein the UE 110 continues to monitor the number of missing uplink events. If the threshold value is achieved, the method 300 may advance to 340. It should be noted that the threshold value may be set based on a number of factors including the UE 110 operating experience. For example, the threshold value may initially be a predetermined number of events that the manufacturer of the UE 110 decides is a number that is lower than a critical number for various networks to declare an RLF. In another example, a service provider (e.g., AT&T, Verizon, T-Mobile, etc.) may have collected data from multiple UEs for its network and this data may be used to set the threshold value. In a further example, the UE 110 may also record occurrences of RLFs that the UE 110 has experienced and the associated number of events that occurred prior to the RLF and dynamically change the threshold based on this operating experience. In addition, when setting the thresholds using any of these exemplary manners, the setting may be based on granular characteristics such as operating area, eNB connection, etc.

In 340, once the critical threshold is reached, the baseband processor 120 of the UE 110 may assert a pre-RLF alarm. As part of asserting the pre-RLF alarm, the baseband processor 120 of the UE 110 may notify the other components 150 of the UE 110 of the pre-RLF alarm so that the other components 150 may transition to a lower power state to allow the UE 110 to operate in full LTE duty cycle. In the examples provided above, the baseband processor 120 may notify the other components 150 using a hardware control line. However, the baseband processor 120 may notify the other components 150 using other manners of notification.

After the network has been informed that the UE 110 is still connected to the associated base station and the baseband processor determines that an RLF is no longer imminent, the baseband processor, in 350, de-asserts the pre-RLF alarm. As described above, when the pre-RLF alarm is de-asserted, the UE 110 may transition to the intermediate state S2. In addition, the other components 150 will be informed that the pre-RLF alarm is de-asserted, thereby allowing the other components 150 to transition back to their normal power state.

Figure 4:
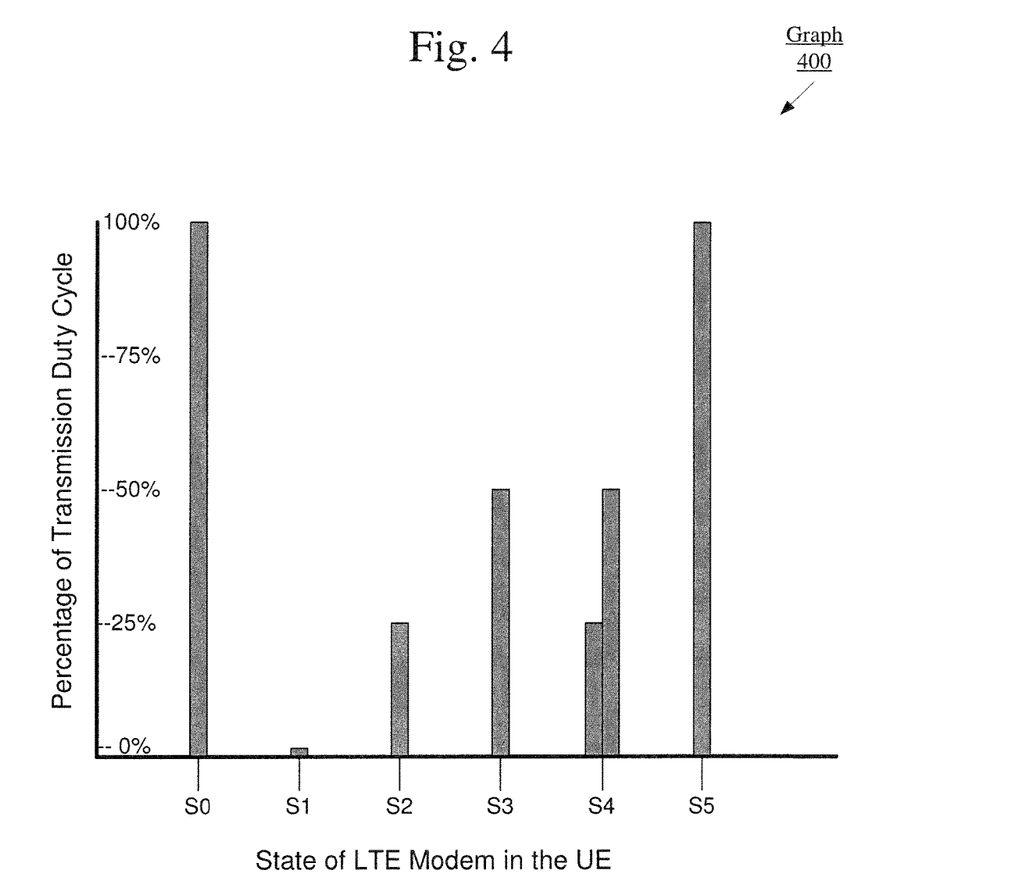
FIG. 4 shows an exemplary graph illustrating the percentage of transmission duty cycle used for various states of the LTE modem of the UE according to various exemplary embodiments described herein.

FIG. 4 shows an exemplary graph 400 illustrating the percentage of transmission duty cycle used for various states of the LTE modem of the UE according to various exemplary embodiments described herein. Specifically, the graph 400 shows each of the states S0-S5 as discussed above in method 200 of FIG. 2. As depicted in the graph 400, the state S0 (e.g., normal operation) may allow the LTE modem 120 of the UE 110 to operate at an unconstrained 100% duty cycle. When a battery alarm is asserted in S1, the duty cycle of the UE 110 may be reduced to 0%, wherein the transmission power is off for a predetermined time frame. As the UE 110 gradually transitions to state S2, the transmission duty cycle is increased to a limited value, such as 25%. Additionally, as the UE 110 further transitions to state S3, the transmission duty cycle is increased to a greater limited value, such as 50%.

As noted above, the state S4 represents the pre-critical state for the UE 110. The UE 110 may transition to the state S4 from either the 25% duty cycle of state S2 or the 50% duty cycle of the state S3. Whichever state the UE 110, the duty cycle of the state S4 will remain unchanged. Thus, at the state S4, the duty cycle may be either the limited value (e.g., 25%) or the greater limited value (e.g., 50%).

From the pre-critical state S4, the UE 110 may transition to the critical state S5. While in the state S5, the duty cycle of the UE 110 may be allowed to operate unconstrained at 100%. It should be noted that the duty cycle percentage value depicted in graph 400 of FIG. 4 are merely exemplary values. Accordingly, the various embodiments of the systems and methods described herein are not limited to the simplified values of 0%, 25%, 50%, and 100%, as any alternative increments and/or additional values and states of the LTE modem 120 may be used.

It should be noted that the intermediate duty cycles of 25% and 50% are only exemplary. That is, it may be determined that the intermediate duty cycles for states S2, S3 and S4 may be other percentages of the full duty cycle. For example, it may be determined that the intermediate duty cycles be set at a greater percentage of the full duty cycle (e.g., 33% and 66%, respectively) or a lesser percentage of the full duty cycle (e.g., 15% and 40%, respectively). In one example, if the UE is in light traffic conditions where there is no eNE scheduling for some time, e.g., the UE is not receiving UL grants, then the 25% duty cycle may be increased. In addition, it may be determined that the state S5 critical duty cycle is not required to be the full duty cycle, but only a percentage of the full duty cycle to accomplish the goal of assuring that an uplink transmission reaches the network (e.g., 75-99% of full duty cycle). In addition, the maximum duty cycle for the UE 110 may be a duty cycle that is set by the network.

It may be noted that the exemplary embodiments are described with reference to the LTE wireless communication system. However, those skilled in the art will understand that the exemplary embodiments may be applied to managing the transmission power within any wireless communication schemes including those having different characteristics from the LTE scheme.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

The invention claimed is:

1. A method, comprising:
at a user equipment (UE) that communicates with a wireless network via a base station:
determining whether a battery alarm of the UE is asserted;
reducing a transmission duty cycle of the UE to zero for a first predetermined time period when the battery alarm is asserted;
determining whether the battery alarm has been de-asserted after the first predetermined time period; and
when the battery alarm has not been de-asserted, increasing the transmission duty cycle to a first threshold level for a second predetermined time period, wherein the first threshold level is less than a full transmission duty cycle of the UE.

2. The method of claim 1, further comprising:
when the battery alarm has been de-asserted, increasing the transmission duty cycle to a second threshold level for a third predetermined time period, wherein the second threshold level is less than the full transmission duty cycle of the UE, and wherein the second threshold level is greater than the first threshold level.

3. The method of claim 2, further comprising:
after the third predetermined time period, determining whether the battery alarm has been de-asserted;
when the battery alarm has not been de-asserted, reducing the transmission duty cycle of the UE to zero for the first predetermined time period; and
when the battery alarm has been de-asserted, increasing the transmission duty cycle to the full transmission duty cycle.

4. The method of claim 2, further comprising:
when the transmission duty cycle of the UE is set to the first or second threshold level, determining whether a pre-radio link failure (pre-RLF) alarm has been asserted for the UE;
when the pre-RLF alarm is asserted, continuing a current transmission duty cycle of the UE for a fourth predetermined time period and notifying components of the UE of the pre-RLF alarm; and
after the fourth predetermined time period, increasing the transmission duty cycle to the full transmission duty cycle.

5. The method of claim 4, further comprising:
when the pre-RLF alarm is asserted, determining whether the pre-RLF alarm has been de-asserted; and
when the pre-RLF alarm has been de-asserted, decreasing the transmission duty cycle to the first threshold level.

6. The method of claim 2, wherein the first threshold level of the transmission duty cycle is 5-50% of the full transmission duty cycle of the UE and the second threshold level of the transmission duty cycle is 20-75% of the full transmission duty cycle of the UE.

7. The method of claim 1, further comprising:
after the second predetermined time period, determining whether the battery alarm has been de-asserted;
when the battery alarm has not been de-asserted, maintaining the transmission duty cycle of the UE to the first threshold level; and
when the battery alarm has been de-asserted, increasing the transmission duty cycle to a second threshold level for a third predetermined time period.

8. The method of claim 1, further comprising:
determining a number of missing uplink events, wherein the missing uplink events are events that the base station is scheduled to receive from the UE in an uplink, but are not received by the base station; and
when the number of missing uplink events meets a pre-radio link failure ("pre-RLF") threshold, asserting a pre-RLF alarm.

9. The method of claim 8, further comprising:
when the pre-RLF alarm is asserted, determining whether the wireless network is aware that the UE is currently connected to the base station; and when it is determined the wireless network is aware the UE is currently connected to the base station, de-asserting the pre-RLF alarm.

10. The method of claim 9, wherein the determining whether the wireless network is aware that the UE is currently connected to the base station includes one of:
receiving an acknowledgement ("ACK") from the base station; or
sending a measurement report to the base station.

11. The method of claim 1, wherein the battery alarm is a pre-undervoltage lockout ("pre-UVLO") alarm that indicates a battery voltage has dropped below a predetermined battery voltage threshold.

12. The method of claim 1, wherein the base station is an evolved Node B ("eNB") and the wireless network is a Long Term Evolution ("LTE") network or an LTE-Advanced network.

13. A user equipment ("UE"), comprising:
a battery;
a power management component that monitors the battery and asserts a battery alarm; and
a baseband processor that controls a transmission duty cycle of the UE, wherein the baseband processor reduces the transmission duty cycle of the UE to zero for a first predetermined time period when the battery alarm is asserted and wherein, after the first predetermined time period, the baseband processor further increases the transmission duty cycle to a first threshold level for a second predetermined time period when the battery alarm continues to be asserted and increases the transmission duty cycle to a second threshold level for a third predetermined time period when the battery alarm has been de-asserted.

14. The UE of claim 13, wherein the first and second threshold levels are less than a full transmission duty cycle of the UE, and wherein the second threshold level is greater than the first threshold level.

15. The UE of claim 13, wherein, after the third predetermined time period, the baseband processor reduces the transmission duty cycle of the UE to zero for the first predetermined time period when the battery alarm has not been de-asserted or increases the transmission duty cycle to a full transmission duty cycle when the battery alarm has been de-asserted.

16. The UE of claim 13, wherein the baseband processor further monitors an uplink with which the UE is connected to a wireless network and asserts a pre-radio link failure ("pre-RLF") alarm based on uplink events.

17. The UE of claim 16, further comprising:
additional components, wherein the baseband processor notifies the additional components of the UE of the pre-RLF alarm and wherein the additional components reduce a power consumption based on a receipt of the notification of the pre-RLF alarm.

18. The UE of claim 13, wherein, after the second predetermined time period, the baseband processor maintains the transmission duty cycle of the UE to the first threshold level when the battery alarm has not been de-asserted, or increases the transmission duty cycle to the second threshold level for the third predetermined time period when the battery alarm has been de-asserted.

19. A baseband processor of a user equipment ("UE"), comprising:
a general purpose input receiving an indication that a battery alarm has been asserted for the UE; and
circuitry configured to control a transmission duty cycle of the UE, wherein the circuitry reduces the transmission duty cycle of the UE to zero for a first predetermined time period when the battery alarm is asserted and wherein, after the first predetermined time period, the circuitry further increases the transmission duty cycle to a first threshold level for a second predetermined time period when the battery alarm continues to be asserted and increases the transmission duty cycle to a second threshold level for a third predetermined time period when the battery alarm has been de-asserted.

20. The baseband processor of claim 19, further comprising:
circuitry configured to monitor an uplink with which the UE is connected to a wireless network and assert a pre-radio link failure ("pre-RLF") alarm based on uplink events; and
a general purpose output sending an indication to other components of the UE that the pre-RLF alarm has been asserted.

* * * * *